United States Patent [19]

Iwata et al.

[11] Patent Number: 4,475,635

[45] Date of Patent: Oct. 9, 1984

[54] VORTEX FLOW SHOCK ABSORBER WITH ONE-WAY VALVE

[75] Inventors: Kazuroh Iwata, Kamakura; Naoto Fukuhsima, Fujisawa; Kunihiko Hidaka, Yokohama, all of Japan

[73] Assignee: Nissan Motor Company, Limited, Yokohama, Japan

[21] Appl. No.: 310,063

[22] Filed: Oct. 9, 1981

[30] Foreign Application Priority Data

Oct. 14, 1980 [JP] Japan .............. 55-145180

[51] Int. Cl.³ .............................. F16F 9/34
[52] U.S. Cl. ..................... 188/282; 137/513.7; 188/320
[58] Field of Search .......... 188/275, 281, 282, 314, 188/315, 317, 318, 320, 322.15, 322.22; 137/513.7; 267/8 R, 64.15, 113, 118, 124, 126, 127, 140.1

[56] References Cited

U.S. PATENT DOCUMENTS

| 2,722,288 | 11/1955 | Steinbauer | 267/8 R |
| 3,362,508 | 1/1968 | Mayer | 188/320 |
| 3,550,616 | 12/1970 | Graham et al. | 137/513.7 |
| 3,672,474 | 6/1972 | Mayer et al. | 188/282 |
| 4,307,653 | 12/1981 | Goes et al. | 188/281 |
| 4,344,637 | 8/1982 | Williams, Jr. et al. | 188/317 |

FOREIGN PATENT DOCUMENTS

| 731487 | 4/1966 | Canada | 267/64.15 |
| 47954 | 3/1982 | European Pat. Off. | 188/282 |
| 49844 | 4/1982 | European Pat. Off. | 188/320 |
| 49894 | 4/1982 | European Pat. Off. | 188/322.15 |
| 931816 | 7/1955 | Fed. Rep. of Germany . | |
| 1253073 | 10/1967 | Fed. Rep. of Germany . | |
| 2604467 | 8/1976 | Fed. Rep. of Germany . | |
| 2915489 | 10/1979 | Fed. Rep. of Germany | 188/318 |
| 845638 | 8/1939 | France | 267/64.15 |
| 1073827 | 9/1954 | France | 188/317 |
| 2466676 | 4/1981 | France . | |
| 56-90139 | 7/1981 | Japan | 188/282 |
| 2044882 | 10/1980 | United Kingdom . | |
| 2056613 | 3/1981 | United Kingdom . | |

*Primary Examiner*—Douglas C. Butler
*Assistant Examiner*—R. R. Diefendorf
*Attorney, Agent, or Firm*—Schwartz, Jeffery, Schwaab, Mack, Blumenthal & Koch

[57] ABSTRACT

A vortex flow shock absorber includes a piston having a vortex chamber therein. The piston communicates with one fluid chamber defined in a absorber cylinder via a vortex chamber and with the other fluid chamber separated from the former by the piston via a flow restricting opening. One-way valve is provided in a piston rod which defines a fluid passage permitting one way flow of the fluid from the vortex chamber to one of the fluid chamber. The one-way valve is responsive to an excessive fluid pressure in the vortex chamber to relieve the fluid pressure exceeding a predetermined value. The piston and piston rod are attached together with pressure welding. This simplifies the assembling operation of the piston onto the piston rod.

14 Claims, 4 Drawing Figures

4,475,635

VORTEX FLOW SHOCK ABSORBER WITH ONE-WAY VALVE

BACKGROUND OF THE INVENTION

The present invention relates generally to a hydraulic shock absorber applicable to the suspension of a vehicle, such as an automotive vehicle. More specifically, the invention relates to a shock absorber having a relief mechanism for relieving excessive hydraulic pressure which may adversely affect the riding comfort of the vehicle.

Vortex flow shock absorbers of various constructions are well known. Such shock absorbers are particularly useful in suspensions for compact size vehicles. In conventional vortex flow shock absorbers it is necessary to provide a relief mechanism for relieving excessive hydraulic pressure and, in turn, for preventing the shock absorber from producing too great a shock absorbing force for comfort. To accomplish this requirement, there have been developed various pressure relief mechanisms for vortex flow shock absorbers.

However, the prior art pressure relief mechanisms have complicated constructions resulting in difficulty in assembling.

SUMMARY OF THE INVENTION

Therefore, it is a principle object of the present invention to provide a vortex flow shock absorber with a relief mechanism of simple construction, which will allow easy assembling of the shock absorber.

Another and more specific object of the invention is to provide a vortex flow shock absorber which incorporates a one-way valve as the pressure relief mechanism, the valve being provided in a piston rod in order to easily attach a piston onto the piston rod.

To accomplish the above-mentioned and other objects, there is provided a vortex flow shock absorber which includes a piston having a vortex chamber therein. The piston communicates with a first fluid chamber of the shock absorber cylinder via a vortex chamber and with a second fluid chamber, separated from the first by the piston, via a flow restricting opening. A one-way valve is provided in a piston rod which defines a fluid passage permitting one way flow of fluid from the vortex chamber to one of the fluid chambers. The one-way valve is responsive to excessive fluid pressure in the vortex chamber to relieve the fluid pressure.

According to the present invention, the piston and piston rod can be attached together with pressure welding. This simplifies the assembling operation of the piston onto the piston rod.

BRIEF DESCRIPTION OF THE DRAWINGS

The present invention will be more fully understood from the detailed description given hereinbelow and from the accompanying drawings of preferred embodiments of the present invention which, however, should not be taken as limiting the present invention but for elucidation and explanation only.

In the drawings.

DESCRIPTION OF THE PREFERRED EMBODIMENT

Figure 1:
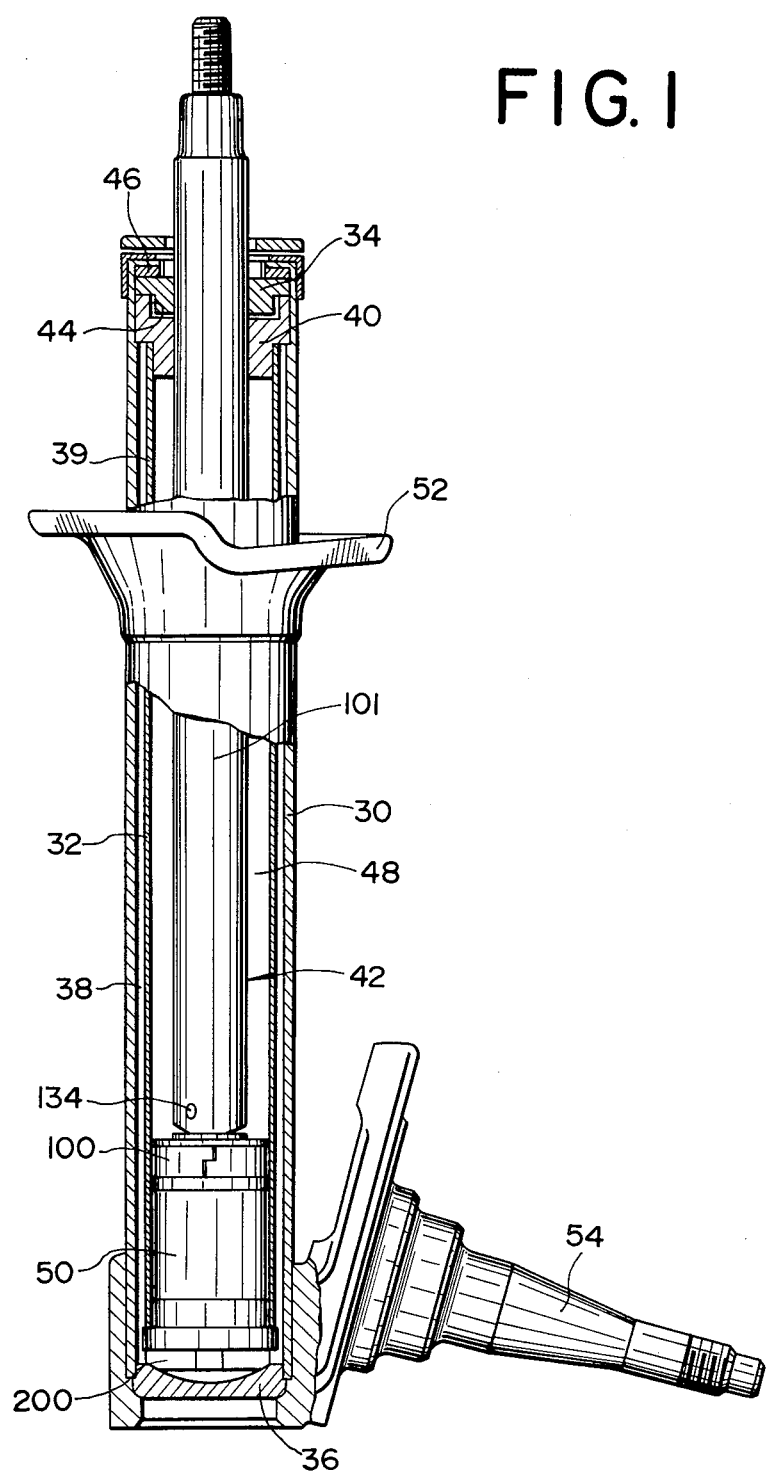
FIG. 1 is a longitudinal section of a preferred embodiment of a vortex flow shock absorber according to the present invention.

Referring now to FIG. 1, there is illustrated the preferred embodiment of a directacting shock absorber according to the present invention. The shock absorber includes outer and inner cylinders 30 and 32 coaxially arranged with respect to each other. The outer cylinder 30 is closed; the upper and lower ends with elastic sealers 34 and 40 and an end fitting 36 respectively. The inner cylinder 32 is disposed within the outer cylinder 30 in spaced relationship to define therebetween a fluid reservoir chamber 38. A bottom fitting 200 is attached at the lower end of the inner cylinder 32. The upper end of the inner cylinder 32 is closed with an elastic sealer 40 to define a fluid chamber 42 in the inner cylinder which is filled with a working fluid. The sealer 40 has a recess 44 on the upper surface thereof which receives a downwardly projecting portion at the lower surface of the sealer 34. Also, the sealer 34 secures a sealing ring 46 against an inner surface of the upper end of the outer cylinder 30.

Figure 2:
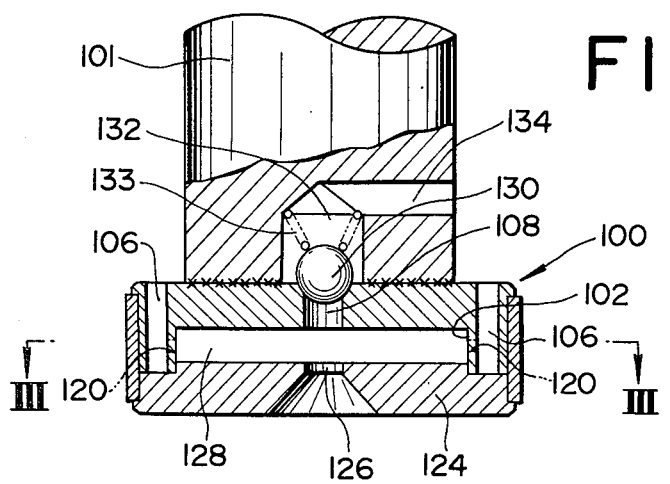
FIG. 2 is an enlarged section of a piston of the shock absorber of FIG. 1.
Figure 4:
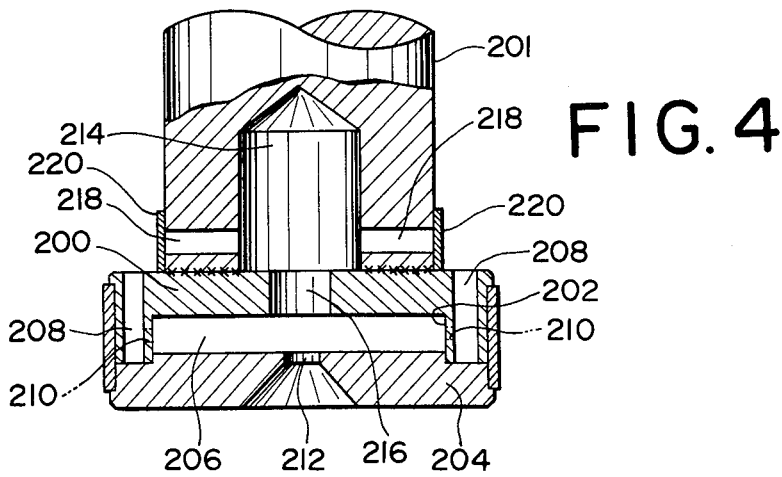
FIG. 4 is a similar view to FIG. 2 and showing another embodiment of the piston of the shock absorber.

Piston 100 is movably disposed within the fluid chamber 42. The piston 100 is connected to the lower end of a piston rod 101 with pressure welding. The piston 100 divides the fluid chamber 42 into upper and lower fluid chambers 48 and 50. As shown in FIGS. 2 and 4, the piston 100 is formed with a circular groove 102 therein.

The piston 100 is formed with vertically extending openings 106 adjacent the circumference thereof and has a vertically extending opening 108 through the axial center of an upper horizontal section thereof.

To the lower end of the piston, a fitting 124 with a central opening 126 is secured to define a vortex chamber 128 within the groove 102. The vortex chamber 128 communicates with the upper fluid chamber 48 via vortex passages 120 and the openings 106. In turn, the vortex chamber 128 communicates with the lower fluid chamber 50 via the opening 126.

The vortex chamber 128 further communicates with the upper fluid chamber 48 via the opening 108. The upper end of the opening 108 is closed by a ball-shaped closure 130 which is disposed within a groove 132 formed on the lower end of the piston rod 101. The closure 130 is adapted to be movable within the groove 132 along the piston rod axis and is urged toward the upper end of openings 108 by a helical coil spring 133 which is also disposed within the groove 132. The groove 132 communicates with the upper chamber 48 via a lateral passage 134 which extends laterally through the piston rod 101. The closure 130, the coil spring 133 in the groove 132 constitute a one-way valve 136, restricting fluid flow from the upper fluid chamber 48 to the vortex chamber 128.

During a compression stroke, the piston 100 moves downwardly to expand the volume of the upper fluid chamber 48, thus reducing the fluid pressure therein and to compress the volume of the lower fluid chamber 50, thus increasing the fluid pressure therein. Due to the fluid pressure difference between the upper and lower fluid chambers 48 and 50, fluid flow is produced from the lower fluid chamber 50 to the upper fluid chamber 48. Fluid flows into the vortex chamber 128 via the opening 126 in the fitting 124. The fluid in the vortex chamber 128 flows through the vortex passages 120, and the openings 106 to the upper fluid chamber 48. At the same time, the closure 130 is forced upwardly against a set pressure from the coil spring 132 to open the upper end of the openings 108 to permit fluid in the vortex chamber 128 therethrough.

On the other hand, due to an increase in the fluid pressure in the lower fluid chamber 50, fluid flows into the fluid reservoir 38 via the bottom fitting 200. By increasing the fluid amount in the fluid reservoir chamber 38, gas in an upper section 39 of the fluid reservoir chamber is compressed resulting in an increase in the pressure thereof.

During an expansion stroke, the piston 100 moves upwardly to expand the volume of the lower fluid chamber 50 thereby reducing the fluid pressure therein and to reduce the volume of the upper fluid chamber 48 thereby increasing the fluid pressure therein. Due to the fluid pressure difference between the upper and lower fluid chambers 48 and 50, fluid flow is produced from the upper fluid chamber 48 to the lower fluid chamber 50. Fluid flows into the vortex chamber 128 in vortex fashion via the vortex passages 120 in order to produce an absorbing force against the shock. Fluid in the vortex chamber 128 then flows through the opening 126 to the lower fluid chamber 50.

On the other hand, due to a reducing of the fluid pressure in the lower chamber 50, fluid in the fluid reservoir chamber 38 flows into lower chamber 50 via the bottom fitting 200.

During the fluid flow as set forth, the vortex passages 120 and opening 126 serve as flow limiting orifices to produce a resistance to fluid flow. On the other hand, the vortex produced in the vortex chamber 128 also results in a resistance against fluid flowing through the vortex chamber. If the piston stroke is so small or the piston speed is so low that it cannot generate sufficient resistance against the fluid flowing through the vortex chamber 128, the resistance provided by the orifice effect of the vortex passages 120 and the opening 126 works as the main factor for producing an absorbing force against a shock applied to the shock absorber. When the piston stroke becomes large enough or the piston speed is sufficiently increased, the vortex in the vortex chamber 128 provides a sufficient resistance against the fluid flowing through the vortex chamber.

Here, since the fluid pressure in the vortex chamber 128 of the piston 100 is substantially the same as that in the lower fluid chamber, if the fluid pressure in the lower chamber becomes greater than that of the set pressure of the closure 130, the closure 130 is moved upwardly to allow fluid to flow therethrough. Thus, the closure 130 with the coil spring 133, the groove 132, the lateral passage 134 and the opening 108 serves as a relief valve for preventing the shock absorber from producing excessive absorbing force.

The absorbing force produced in the vortex chamber by the vortex is proportional to the diameter of the vortex chamber. According to a preferred embodiment of the present invention, since the vortex passages are formed on the circumference of the piston, the diameter of the vortex chamber can be a maximum in spite of the presence of the vortex passages. This, in turn, allows for a reduced piston diameter and a more compact shock absorber.

Further, since the piston 100 is attached to the lower end of the piston rod 101 by pressure welding, the assembling of piston-and-rod assembly is simple to increase manufacturing efficiency.

In FIG. 1, the reference numerals 52 and 54 represent a spring seat and a steering knuckle respectively. However, these elements are only illustrated for the purpose of showing the specific construction of the shock absorber, and it should be appreciated that these are not always provided on a shock absorber of the present invention.

Figure 3:
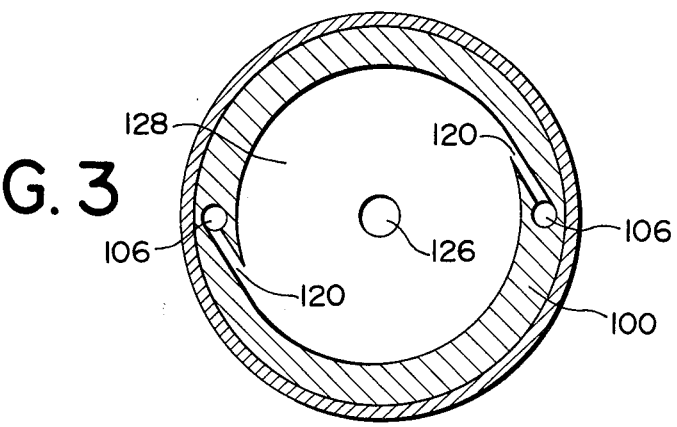
FIG. 3 is a transverse section of the piston taken along line III—III of FIG. 2.

FIG. 4 shows a modification of the preferred embodiment of the piston of the shock absorber of FIGS. 2 and 3. In the embodiment of FIG. 4, the piston 200 is attached to the lower end of the piston rod 201, preferably by way of pressure welding, in a manner similar to the embodiment of FIGS. 2 and 3. The piston 200 is formed with a circular recess 202 on the lower surface thereof. The recess 202 is closed at a lower end thereof with a fitting 204 in order to define a vortex chamber 206. The vortex chamber 206 communicates with the upper chamber 48 in the cylinder of the shock absorber through vertical passages 208 and vortex passages 210. On the other hand, the vortex chamber 206 communicates with the lower chamber 50 via a central opening 212 formed in the fitting 204.

At the lower end of the piston rod 201, there is formed an axially extending groove 214. The vortex chamber 206 communicates with the groove 214 via a central opening 216 formed in a horizontal section of the piston 200. The groove, in turn, communicates with the upper chamber 48 through lateral passages 218 which extend transversely through the piston rod 201 adjacent a lower end thereof. The outer end of the lateral passages 218 are closed by a resilient closure member 220. As shown in FIG. 3, the resilient closure member 220 may be attached to the periphery of the piston rod 201 at one end thereof, the other end being movable from the periphery of the piston so that the fluid in the vortex chamber 206 can flow therethrough.

Therefore, in this embodiment, the piston-and-rod assembly can be easily assembled by way of pressure welding to increase the efficiency of manufacturing the shock absorber. Further, even though the construction of the piston is simple, enough space is provided for the vortex chamber to effectively work and produce a resistance against fluid flow by creating a vortex flow. Furthermore, the one-way valve formed in the lower end of the piston rod serves to relieve fluid pressure in the vortex chamber when the pressure in the vortex chamber becomes greater than that of a predetermined set pressure.

Thus, the present invention fulfills all of the objects and advantages sought thereto.

We claim:

1. A vortex flow shock absorber comprising:
   a cylinder defining a fluid chamber filled with a working fluid;
   a piston rod coaxially disposed within the cylinder;
   a piston fixed to a lower end of said piston rod and reciprocally movable in said cylinder, said piston dividing said fluid chamber into first and second chambers and having therein a vortex chamber;
   a first fluid passage in said piston for establishing fluid communication between said first chamber and said vortex chamber, said first fluid passage being operable to produce a vortex pattern fluid flow when working fluid is introduced into said vortex chamber therethrough;

a second fluid passage in said piston for establishing fluid communication between said vortex chamber and said second chamber, said second fluid passage being operable to produce a radial pattern fluid flow in said vortex chamber when said working fluid is introduced into said vortex chamber therethrough;

a pressure relieving passage extending through said piston and said piston rod for establishing fluid communication between said vortex chamber and said first chamber; and a pressure relief valve biased to normally close said pressure relieving passage, said valve being responsive to a fluid pressure in said vortex chamber exceeding a predetermined set pressure to open said pressure relieving passage to permit fluid flow from said vortex chamber to said first chamber therethrough.

2. A vortex flow shock absorber comprising:
a hollow cylinder;
a piston rod coaxially positioned within said cylinder;
a piston fixed to a lower end of said piston rod to reciproocate within said hollow cylinder, said piston defining first and second chambers in said hollow cylinder and having a vortex chamber therein, said vortex chamber being in communication with said first and second chambers so that a vortex pattern fluid flow is produced in said vortex chamber when fluid flows through said vortex chamber in a first direction from said first chamber to said second chamber and a radial pattern fluid flow is produced in said vortex chamber when fluid flows through said vortex chamber in a second direction from said second chamber to said first chamber;

a pressure relieving passage comprising a fluid passage extending through said piston and said piston rod for communicating between said vortex chamber and said first chamber; and a pressure relief valve for blocking fluid communication between said vortex chamber and said first chamber via said pressure relieving passage, said valve being responsive to a fluid pressure in said vortex chamber exceeding a predetermined set pressure to permit fluid flow from said vortex chamber to said first chamber.

3. A vortex flow shock absorber comprising:
a hollow cylinder;
a piston rod coaxially disposed within said cylinder;
a piston fixed to said piston rod to reciprocate within said hollow cylinder and to define therein first and second chambers;
a vortex chamber in said piston;
a vortex passage between said first chamber and said vortex chamber and a fluid passage between said second chamber and said vortex chamber to produce a vortex pattern fluid flow when a fluid flows into said vortex chamber from said first chamber and a radial pattern fluid flow when said fluid flows into said vortex chamber from said second chamber;
a pressure relieving passage comprising a continuous fluid passage extending through said piston and piston rod between said first chamber and said vortex chamber; and a pressure relief valve disposed in said pressure relieving passage, said valve being resiliently biased by a predetermined force to normally block fluid communication between said vortex chamber and said first chamber, said valve being responsive to fluid pressure in said vortex chamber exceeding a predetermined pressure to overcome said predetermined force to thereby permit fluid flow from said vortex chamber to said first chamber.

4. The shock absorber as set forth in claim 1, 2 or 3 wherein said pressure relieving passage comprises an axial groove in said piston rod and a communication passage transversely extending through the piston rod from said axial groove to said first chamber and wherein said pressure relief valve comprises a closure member releasably closing one end of said axial groove.

5. The shock absorber as set forth in claim 1, 2 or 3, wherein said pressure relief valve comprises a valve seat in said pressure relief passage, a ball-shaped valve member, and a resilient spring urging said ball-shaped valve member onto said valve seat with a spring force, wherein said spring force defines said set pressure 6. The shock absorber as set forth in claim 5, wherein said valve seat is positioned adjacent an end of said pressure relieving passage opening into said vortex chamber for closing said end.

7. The shock absorber as set forth in claim 6, wherein said piston is fixed to said piston rod by pressure welding.

8. The shock absorber as set forth in claim 6, wherein said piston comprises an upper first part welded onto said piston rod and a lower second part fixedly secured to said first part for defining therebetween said vortex chamber in said piston.

9. The shock absorber as set forth in claim 1, 2 or 3, wherein said pressure relief valve comprising a leaf spring operable to normally close said pressure relieving passage, said leaf spring being displaceable to open said pressure relieving passage for establishing communication between said vortex chamber and said first chamber when fluid pressure in said vortex chamber exceeds a set pressure.

10. The shock absorber as set forth in claim 9, wherein said leaf spring is positioned adjacent an upper end of said pressure relieving passage opening to said first chamber.

11. The shock absorber as set forth in claim 10, wherein a lower end of said leaf spring is secured onto an outer periphery of said piston rod, and an upper end of said leaf spring is resiliently biased against said upper end of said pressure relieving passage for normally closing said pressure relieving passage.

12. The shock absorber as set forth in claim 11, wherein said piston is fixed to a lower end of said piston rod by pressure welding.

13. The shock absorber as set forth in claim 11, wherein said piston comprises an upper first part welded to a lower end of said piston rod, and a lower second part secured to said first part for defining therebetween said vortex chamber in said piston.

14. The shock absorber of claim 1, 2, or 3, wherein said pressure relief valve comprises a one-way valve operable to pass fluid only from said vortex chamber to said first chamber.

* * * * *